(12) United States Patent
Walkowski

(10) Patent No.: US 9,884,550 B2
(45) Date of Patent: Feb. 6, 2018

(54) FLAPPER VALVE WITH GUIDE LEGS

(71) Applicant: Eaton Corporation, Cleveland, OH (US)

(72) Inventor: Paul D. Walkowski, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/580,327

(22) Filed: Dec. 23, 2014

(65) Prior Publication Data

US 2015/0107689 A1 Apr. 23, 2015

Related U.S. Application Data

(63) Continuation of application No. PCT/US2013/031030, filed on Mar. 13, 2013.

(60) Provisional application No. 61/670,796, filed on Jul. 12, 2012.

(51) Int. Cl.
| | |
|---|---|
| *B60K 15/035* | (2006.01) |
| *F16K 27/02* | (2006.01) |
| *F16K 24/04* | (2006.01) |
| *B60K 15/03* | (2006.01) |

(52) U.S. Cl.
CPC ...... *B60K 15/03519* (2013.01); *F16K 24/042* (2013.01); *F16K 27/02* (2013.01); *B60K 2015/03269* (2013.01); *B60K 2015/03289* (2013.01); *Y10T 137/3099* (2015.04)

(58) Field of Classification Search
CPC .... B60K 15/03519; B60K 2015/03269; B60K 2015/03289; F16K 27/02; F16K 24/042; Y10T 137/3099

USPC .......................................... 137/202; 251/333
See application file for complete search history.

(56) References Cited

U.S. PATENT DOCUMENTS

| | | | |
|---|---|---|---|
| 1,366,171 A | 1/1921 | Donnelly | |
| 1,488,831 A | 4/1924 | Prall | |
| 2,017,033 A | 10/1935 | McGuffin | |
| 2,744,539 A | 5/1956 | Jones | |
| 3,366,137 A | 1/1968 | Hansen | |

(Continued)

FOREIGN PATENT DOCUMENTS

| | | |
|---|---|---|
| CN | 2849348 Y | 12/2006 |
| EP | 1325829 B1 | 8/2009 |

(Continued)

OTHER PUBLICATIONS

European Patent Office; International Search Report and Written Opinion issued in corresponding International Application No. PCT/US2013/031030. dated Aug. 13, 2013.

*Primary Examiner* — Michael R Reid
*Assistant Examiner* — Patrick Williams
(74) *Attorney, Agent, or Firm* — Quinn IP Law

(57) ABSTRACT

A flapper valve assembly is provided for venting pressure in a tank. The flapper valve assembly includes a float assembly that is configured to be disposed within a valve housing. The float assembly may have a plurality of guide supports that extend from an end portion of the float assembly. A flapper member is movably supported on the float assembly. The flapper member may include a plurality of guide legs that correspond with the guide supports of the float assembly to maintain proper alignment of the flapper member relative to the float assembly.

21 Claims, 5 Drawing Sheets

(56) References Cited

U.S. PATENT DOCUMENTS

| | | | |
|---|---|---|---|
| 3,586,032 A * | 6/1971 | Weinstein | F16K 24/048 |
| | | | 137/202 |
| 3,613,720 A | 10/1971 | Welch | |
| 3,752,366 A | 8/1973 | Lawrence, Jr. | |
| 3,883,111 A | 5/1975 | Jourdan | |
| 4,982,757 A | 1/1991 | Ohasi et al. | |
| 5,090,533 A | 2/1992 | Inoue | |
| 5,265,283 A | 11/1993 | Pourcier | |
| 5,313,977 A * | 5/1994 | Bergsma | B60K 15/03519 |
| | | | 137/202 |
| 5,590,697 A | 1/1997 | Benjey et al. | |
| 5,638,856 A | 6/1997 | Ohsaki | |
| 5,678,590 A | 10/1997 | Kasugai et al. | |
| 5,738,132 A | 4/1998 | Zakai et al. | |
| 5,782,258 A | 7/1998 | Herbon et al. | |
| 5,950,659 A * | 9/1999 | Szlaga | F16K 24/048 |
| | | | 137/202 |
| 5,960,816 A | 10/1999 | Mills et al. | |
| 5,992,441 A | 11/1999 | Enge et al. | |
| 6,035,883 A | 3/2000 | Benjey | |
| 6,058,963 A | 5/2000 | Enge et al. | |
| 6,371,146 B1 | 4/2002 | Benjey | |
| 6,450,192 B1 | 9/2002 | Romanek | |
| 6,508,263 B1 | 1/2003 | Jahnke et al. | |
| 6,517,076 B1 * | 2/2003 | Menage | F16J 15/106 |
| | | | 251/332 |
| 6,691,725 B2 | 2/2004 | Zorine | |
| 6,742,536 B2 | 6/2004 | Mills | |
| 6,810,900 B2 | 11/2004 | Kato | |
| 6,860,285 B2 | 3/2005 | Ehrman et al. | |
| 7,083,062 B2 | 8/2006 | Zorine | |
| 7,146,729 B2 | 12/2006 | Spink et al. | |
| 7,201,155 B2 | 4/2007 | Mills | |
| 7,527,064 B2 | 5/2009 | Kito et al. | |
| 7,607,450 B2 * | 10/2009 | Park | F16K 24/044 |
| | | | 137/202 |
| 7,614,417 B2 | 11/2009 | Simon et al. | |
| 7,717,126 B2 | 5/2010 | Tagami et al. | |
| 7,770,593 B2 | 8/2010 | Moses | |
| 7,770,594 B2 | 8/2010 | Kishi | |
| 7,784,484 B2 | 8/2010 | Furuya | |
| 7,963,296 B2 | 6/2011 | Kaneko | |
| 8,141,576 B2 | 3/2012 | Matsuo | |
| 8,689,816 B2 | 4/2014 | Pifer | |
| 8,770,218 B2 | 7/2014 | Tagami et al. | |
| 8,826,947 B2 | 9/2014 | Hirose et al. | |
| 8,870,020 B2 | 10/2014 | Eckstein et al. | |
| 2001/0050104 A1 | 12/2001 | Nishi et al. | |
| 2003/0098063 A1 | 5/2003 | Mori et al. | |
| 2003/0116190 A1 | 6/2003 | Szlaga | |
| 2004/0089340 A1 | 5/2004 | Muto et al. | |
| 2005/0055817 A1 | 3/2005 | Spink et al. | |
| 2006/0213553 A1 | 9/2006 | Mills et al. | |
| 2007/0000542 A1 | 1/2007 | Johansen | |
| 2007/0163651 A1 | 7/2007 | Quintman et al. | |
| 2009/0178719 A1 | 7/2009 | Matsuo | |
| 2011/0017320 A1 | 1/2011 | Kito et al. | |
| 2011/0139301 A1 | 6/2011 | Hirose et al. | |
| 2011/0203678 A1 * | 8/2011 | Servin | F16K 99/0001 |
| | | | 137/101.19 |
| 2014/0224820 A1 | 8/2014 | Honda et al. | |
| 2015/0090346 A1 | 4/2015 | Erdmann et al. | |
| 2015/0107689 A1 | 4/2015 | Walkowski | |

FOREIGN PATENT DOCUMENTS

| | | |
|---|---|---|
| EP | 2 163 757 A1 | 3/2010 |
| GB | 2 300 246 A | 10/1996 |
| WO | 97/21561 A1 | 6/1997 |

* cited by examiner of a float assembly including
a flapper member that is configured for use with a flapper
valve assembly in accordance with one aspect of the present
disclosure.

FLAPPER VALVE WITH GUIDE LEGS

CROSS-REFERENCE TO RELATED APPLICATION

This application is a continuation of and claims the benefit of PCT Application No. PCT/US2013/031030, filed on Mar. 13, 2013, which claims the benefit of U.S. Provisional Application Ser. No. 61/670,796, filed Jul. 12, 2012, the disclosure of which is incorporated herein by reference in its entirety

TECHNICAL FIELD

The present disclosure generally relates to flapper valve assemblies, including valve assemblies that can be used, for example, to vent vapor pressure in fuel tanks

BACKGROUND

Flapper valve assemblies can be configured to automatically close a vent port in a fuel tank when a fuel level in the tank reaches a predetermined level. To accomplish this, a typical flapper valve assembly may include a flapper member having a sealing surface that seals against a valve seat of the vent port, thereby closing the valve. The quality of the seal, however, can be affected by misalignment of the flapper member relative to the valve seat. For example, such misalignment may occur when the flapper valve assembly is not maintained in a vertical orientation or if the flapper member becomes coaxially misaligned with the valve seat. Further, the quality of the seal may also be affected if the sealing surface of the flapper member sticks to the valve seat before the flapper member properly orients itself relative to the valve seat.

Thus, it would be desirable to provide a flapper valve assembly that is capable of maintaining proper alignment of a flapper member relative to a valve seat and that includes a self-lubricating seal.

SUMMARY

A flapper valve assembly is provided for venting pressure in a tank. The flapper valve assembly includes a float assembly that is configured to be disposed within a valve housing. The float assembly may have a plurality of guide supports that extend from an end portion of the float assembly. A flapper member is movably supported on the float assembly. The flapper member may include a plurality of guide legs that correspond with the guide supports of the float assembly to maintain proper alignment of the flapper member relative to the float assembly.

Various aspects of the present disclosure will become apparent to those skilled in the art from the following detailed description of the embodiments, when read in light of the accompanying drawings.

BRIEF DESCRIPTION OF THE DRAWINGS

Embodiments of the invention will now be described, by way of example, with reference to the accompanying drawings, wherein.

DETAILED DESCRIPTION

Figure 1:
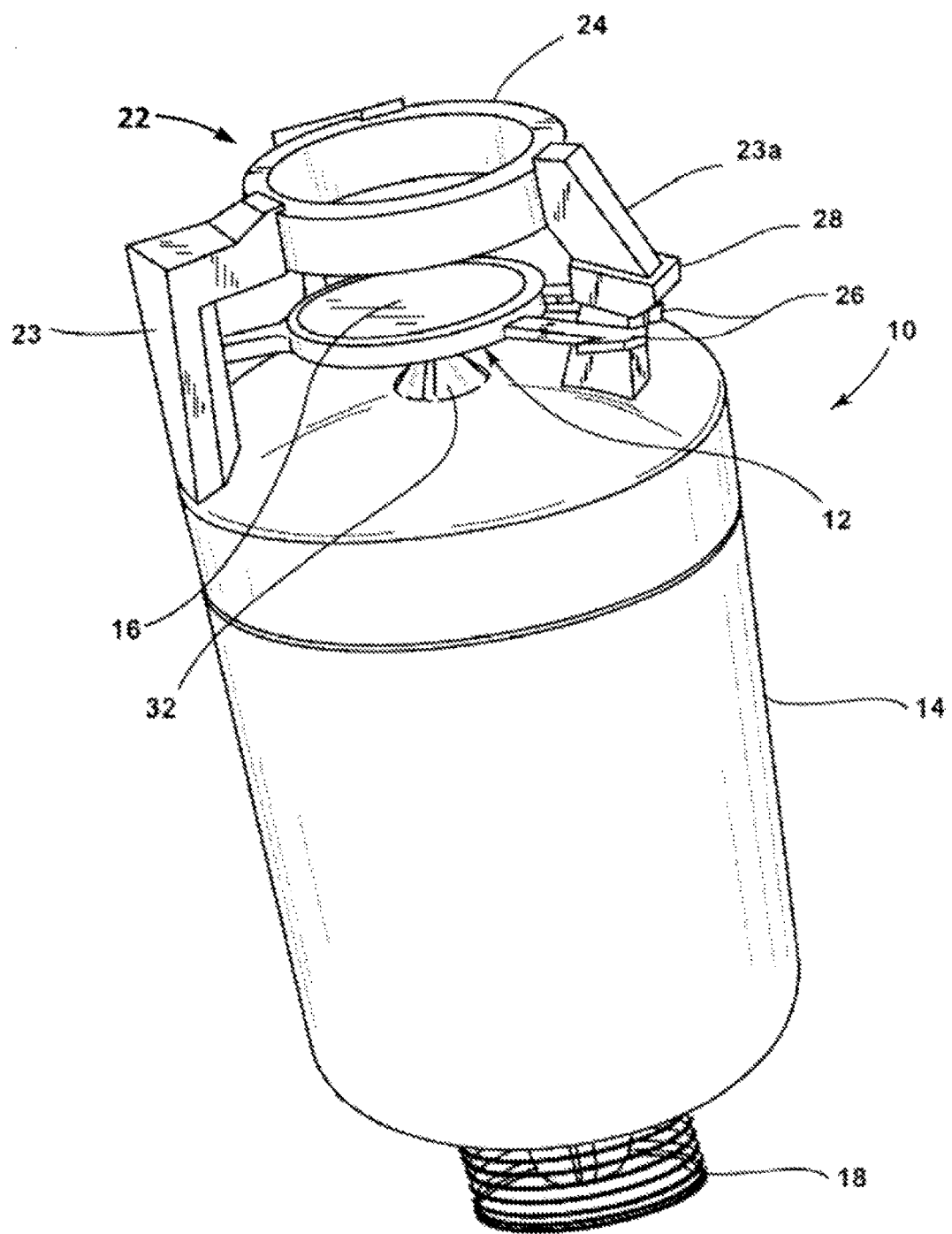
FIG. 1 is a perspective view of a float assembly including a flapper member that is configured for use with a flapper valve assembly in accordance with one aspect of the present disclosure.

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

In general, the present disclosure relates to a flapper valve assembly for venting vapor pressure in a fuel tank. The flapper valve assembly includes a float assembly having a flapper member with a seal. The flapper member and seal are configured to engage a valve seat of the valve assembly to close the valve assembly when a fuel level in the fuel tank reaches a predetermined level. As will be explained in greater detail below, the flapper member may have guide legs that help to maintain proper alignment of the flapper member relative to the valve seat. In addition, the flapper member may include a self-lubricating seal to prevent the seal from sticking to the valve seat. Although the flapper valve assembly will be described for use in a fuel tank, it should be appreciated that the flapper valve assembly can be used in any appropriate environment and for any desired purpose.

Referring now to FIGS. 1-4, a float assembly 10 is shown which can be used in such a flapper valve assembly. The float assembly 10 includes a flapper member 12 in accordance with one aspect of the present disclosure. The float assembly 10 may also include a float body 14 that supports the flapper member 12 for movement relative thereto, as will be further explained below. It should be appreciated that the float assembly 10 may be disposed within a housing of the flapper valve assembly to form a float-operated valve for use as a vent valve in a fuel tank. For example, the float assembly 10 may form part of a flapper valve assembly used as a grade vent valve, fuel limit vent valve, or other fuel tank valves. A spring 18 may provide additional upward force to the float assembly 14 when the flapper valve assembly is oriented in a vertical manner.

Figure 5:
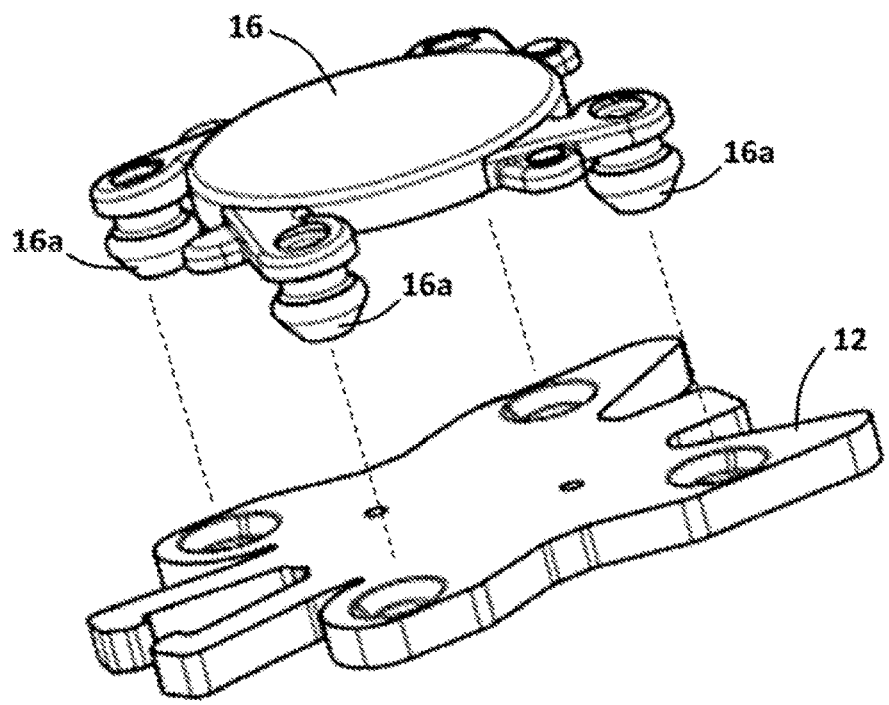
FIG. 5 is a perspective view of the flapper member including a seal supported on the flapper member as shown in FIGS. 1-3.
Figure 6:
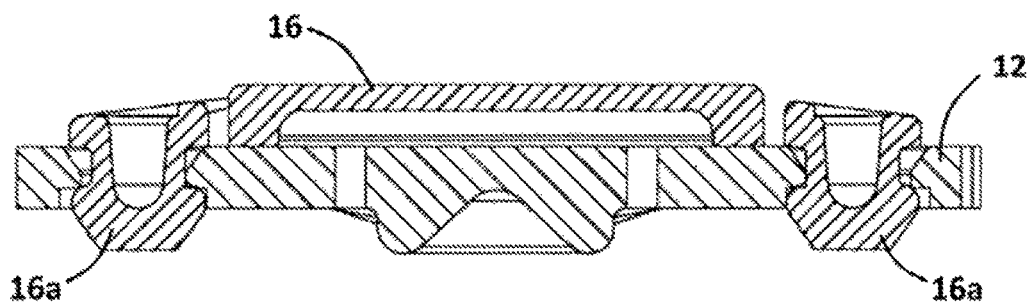
FIG. 6 is a sectional side view of the flapper member and seal shown in FIG. 5.

The flapper member 12 may be made of any suitably rigid material, such as plastic or the like. A seal 16 may be attached to the flapper member 12. The seal 16 can be attached to the flapper member 12 in any manner, including but not limited, to an overmolding process, an adhesive, or a mechanical connection. For example, as more clearly shown in FIGS. 5 and 6, the seal 16 can be attached to the flapper member 12 by pressing resilient protrusions 16a provided on the seal 16 through holes in the flapper member 12.

In one aspect of the present disclosure, the seal 16 can be a self-lubricating member. More specifically, the seal 16 can be made from a base elastomeric material that may contain a self-lubricating material, such as polytetrafluoroethylene (PTFE). As a result, the seal 16 remains lubricated (i.e., slippery) even after being submersed in fuel and/or worn through use. For example, the base elastomeric material can be fluorosilicone or fluorocarbon with PTFE added as a lubricant. The PTFE may constitute approximately 5% of the composition. The composition may, however, include more or less than approximately 5% PTFE if desired. The PTFE can provide lubrication and abrasion-resistance to the elastomer.

Referring again to FIGS. 1-3, an optional cage 22 may be provided near an upper end of the float body 14 to movably support the flapper member 12 on the float assembly 10. The cage 22 may include a plurality of vertical supports 23, including a guide support 23*a*, that extends generally parallel with one another from the upper end of the float body 14. A guide ring 24 interconnects distal ends of the vertical supports 23 and the guide support 23*a*. As such, the guide ring 24 is disposed above the flapper member 12 to restrict the range of motion of the flapper member 12. The guide ring 24 may also ride against the sides of an orifice plate or other guide member provided by the flapper valve assembly to ensure that the float assembly 10 remains coaxially aligned with the valve seat.

Figure 3:
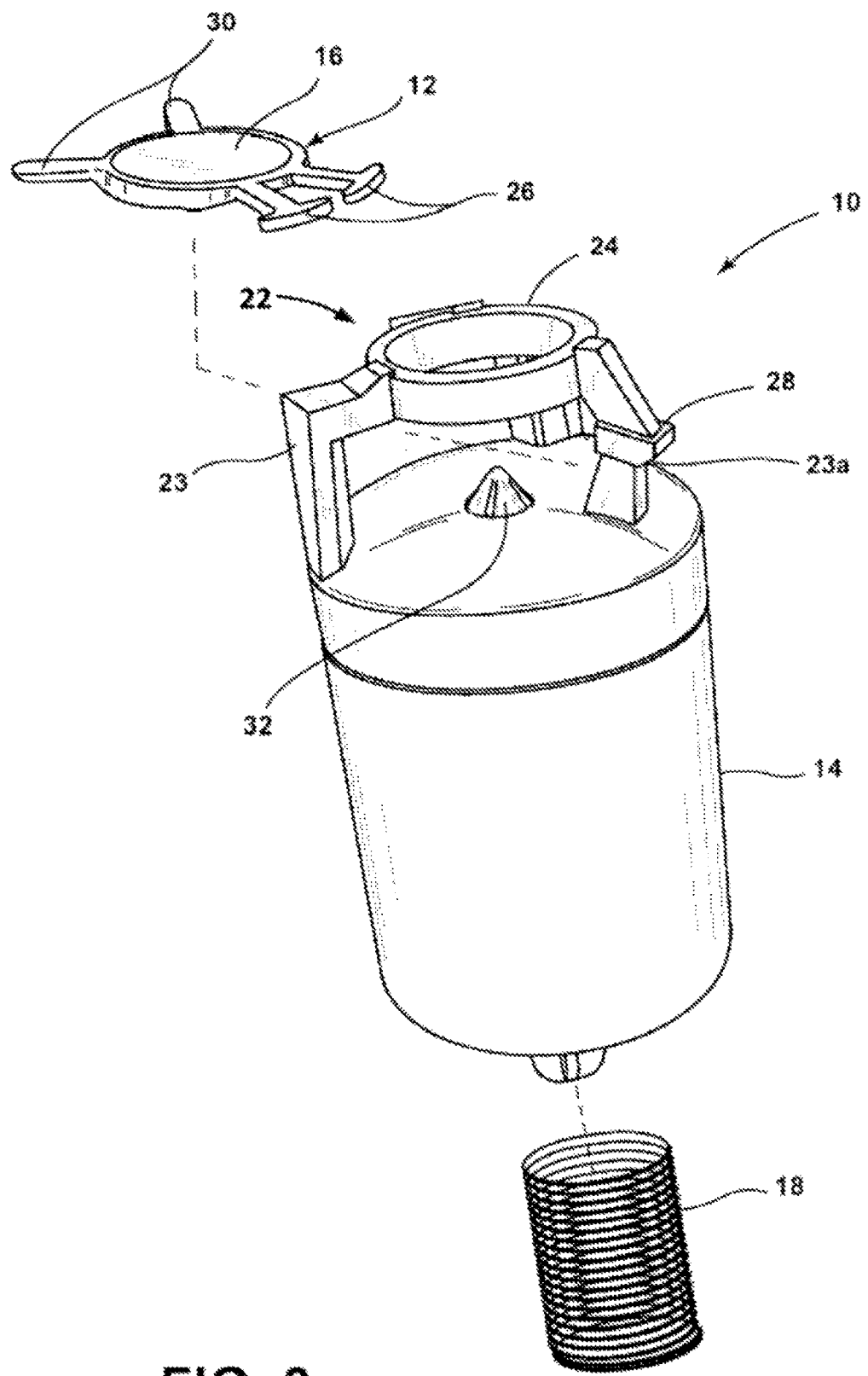
FIG. 3 is an exploded view of the float assembly shown in FIGS. 1 and 2.
Figure 4:
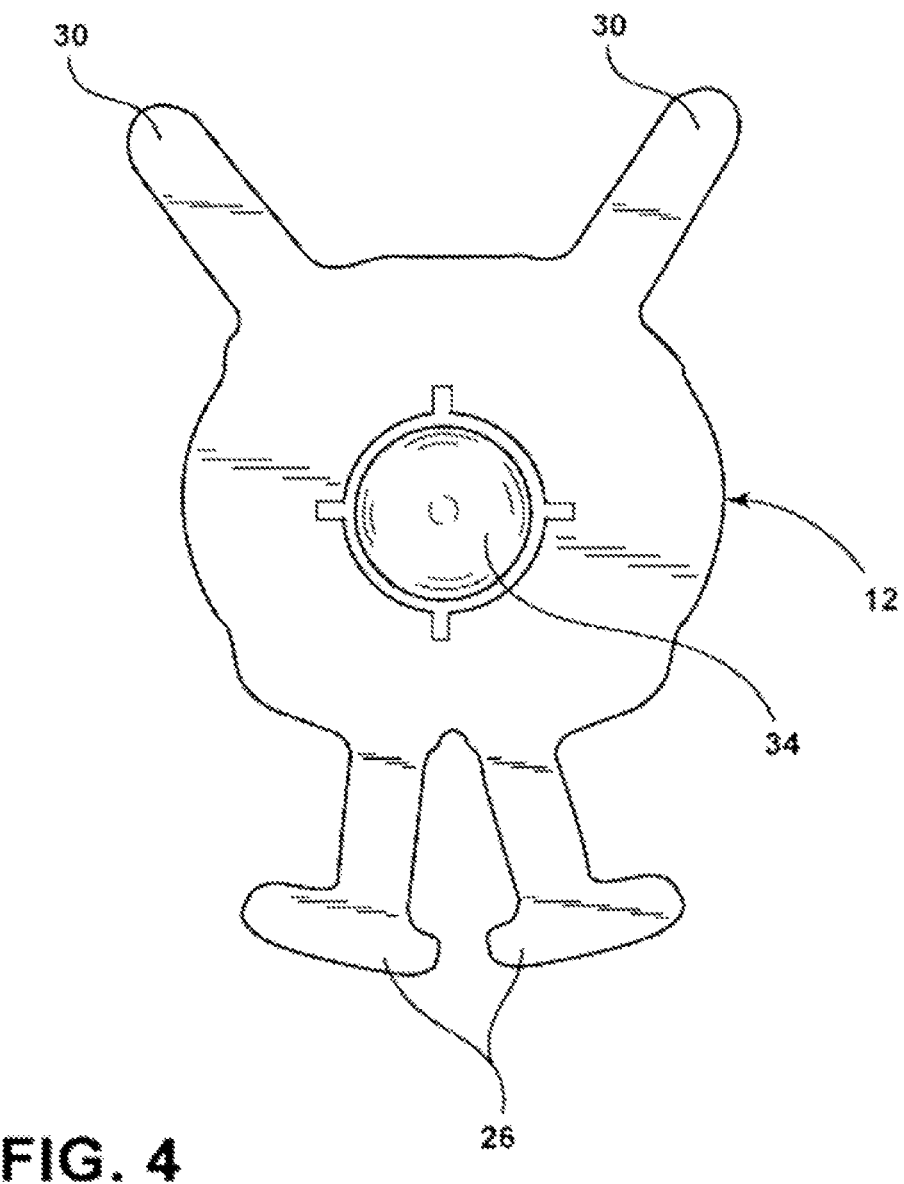
FIG. 4 is a plan view of an underside of the flapper member shown in FIGS. 1 and 2.

As more clearly shown in FIG. 3, the flapper member 12 may have a pair of guide legs 26 that are spaced apart from one another and extend in generally the same direction from a body of the flapper member 12. A pair of projections may be provided on distal ends of the guide legs 26, respectively, to form hook shaped portions that extend toward one another. When the float assembly 10 is assembled, the guide legs 26 extend along opposite sides of the guide support 23*a* and the projections partially extend along an outwardly facing surface of the guide support 23*a*. The guide legs 26 and corresponding projections help to maintain alignment of the flapper member 12 by keeping it centered on the float assembly 10. The flapper member 12 may also include alignment legs 30 that restrict rotational movement of the flapper member 12 relative to the float body 14 by abutting against the vertical supports 23.

In one aspect of the present disclosure, the guide support 23*a* can have a relatively thin profile compared to the other vertical supports 23 to accommodate the guide legs 26 more easily. As shown, the guide support 23*a* may include a ledge 28 located on an intermediate portion thereof. The ledge 28 acts as a positive stop to limit the range of tilting and/or vertical motion of the flapper member 12.

It should be understood that the cage 22 may be omitted, particularly if the flapper member 12 is movably supported on the float body 14 of the float assembly 10 in a way that performs the opening and closing function on its own. Those of skill in the art will recognize that there are alternative ways of supporting the flapper member 12 on the float body 14 that can restrict excessive movement of the flapper member 12 without requiring the cage 22.

To ensure that the float assembly 10 remains coaxially aligned with the valve seat, other alignment structures, such as centering ribs in the valve housing, a ring on the float body 14 to center the float assembly 10 in the valve housing, and a tail structure on the float body 14 that acts as a bearing to prevent the float assembly 10 from tipping off the vertical axis, may also be incorporated.

Figure 2:
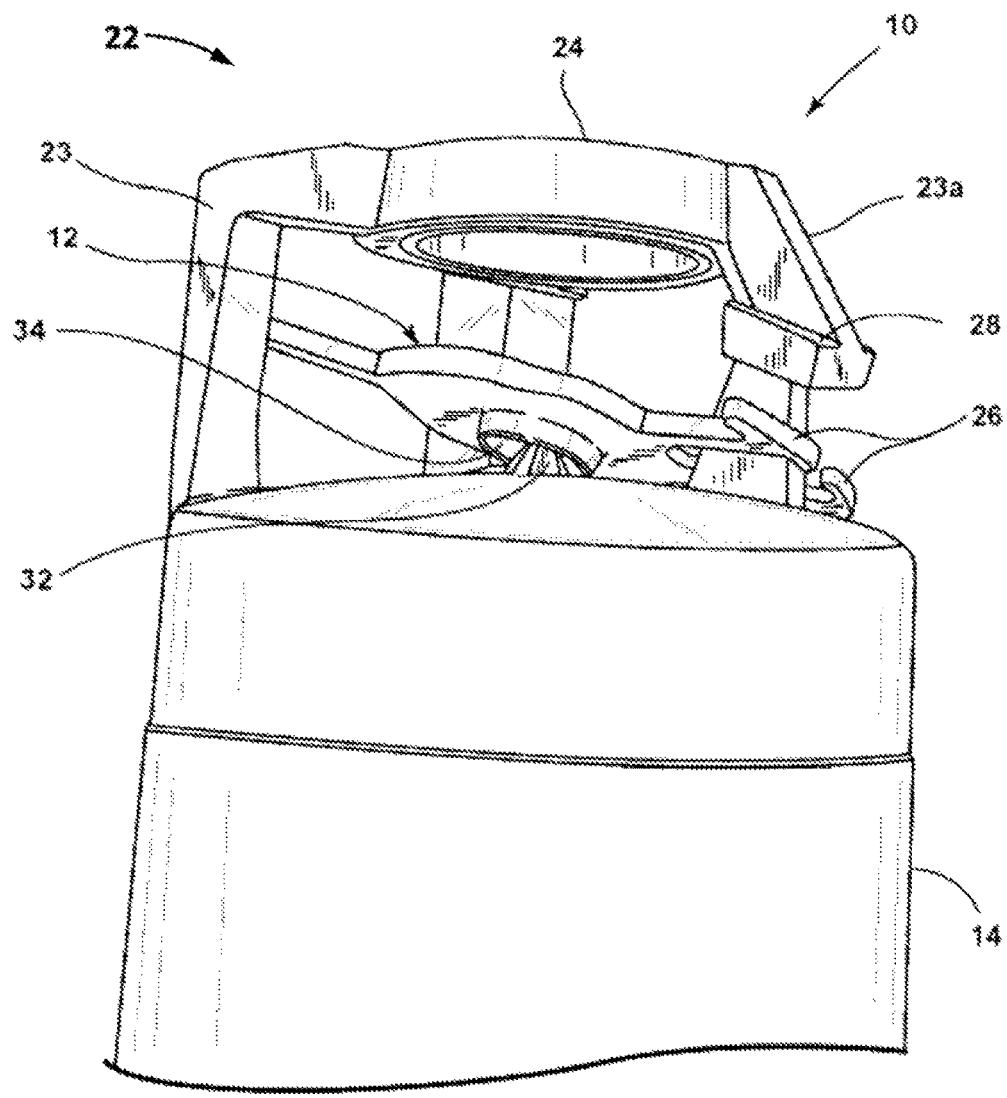
FIG. 2 is another perspective view of the float assembly and the flapper member shown in FIG. 1.

As shown in FIGS. 1-3, a rocking mechanism may be provided between an upper surface of the float body 14 and a lower surface of the flapper member 12 to allow the flapper member 12 to freely pivot in any direction relative to the float body 14. In one aspect of the present disclosure, the rocking mechanism incudes a cone-shaped pin 32 formed on the upper surface of the float body 14 and coaxially aligned with the guide ring 24. A corresponding cone-shaped recess 34 is formed in the underside of the flapper member 12 (see FIG. 4). The pin 32 and recess 34 engage loosely with each other so that the flapper member 12 can freely pivot on the pin 32, creating a gimbal-type connection. It should be appreciated, however, that the cone-shaped pin 32 can be a hemispherical protrusion or any other structure that functions as a gimbal. As more clearly shown in FIG. 1, this freely pivotal connection allows the flapper member 12 to tilt and position itself so the seal 16 can engage squarely with the valve seat regardless of the orientation of the float assembly 10 and regardless of any angular misalignment between the flapper member 12 and the valve seat. The pin 32 and recess 34 minimizes a moment arm of the flapper member 12 to minimize the lateral sliding forces of the flapper member 12.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed is:

1. A flapper valve assembly for venting pressure in a tank, the flapper valve assembly comprising:
   a float assembly configured to be disposed within a valve housing, the float assembly having a plurality of guide supports that extend from an end portion of the float assembly; and
   a flapper member freely pivotable on the float assembly, wherein the flapper member includes a plurality of guide legs that correspond with the plurality of guide supports of the float assembly to maintain proper alignment of the flapper member relative to the float assembly, and
   wherein at least two of the plurality of guide legs have respective projections that extend radially outward beyond opposite sides of at least one of the plurality of guide supports and then at least partially overlap an outwardly facing surface of the at least one of the plurality of guide supports, and
   wherein another at least two of the plurality of guide legs include alignment legs that abut inwardly facing sides of at least two of the plurality of guide supports.

2. A flapper valve assembly comprising:
   a float assembly configured to be disposed within a valve housing, the float assembly including a plurality of vertical supports that extend from an end portion of the float assembly, with one of the vertical supports including a guide support;
   a flapper member freely pivotable on the float assembly, wherein the flapper member includes a plurality of guide legs that are coupled to the guide support of the float assembly to maintain proper alignment of the flapper member relative to the float assembly;
   wherein at least two of the guide legs have respective projections that extend outward along opposite sides of the guide support, and which at least partially extend along and selectively contact an outwardly facing surface of the guide support; and wherein the flapper member includes a plurality of alignment legs that abut respective inwardly facing sides of respective ones of the vertical supports.

3. The flapper valve assembly of claim 1, wherein the float assembly further includes a guide ring that forms a cage with the vertical supports of the float assembly to restrict a range of motion of the flapper member.

4. The flapper valve assembly of claim 1, wherein the guide support of the float assembly further includes a ledge located on an intermediate portion to contact the guide legs of the flapper member and restrict a range of motion of the flapper member.

5. The flapper valve assembly of claim 1, wherein at least one of the guide legs of the flapper member defines a hook shaped portion that surrounds at least part of the guide support of the float assembly.

6. The flapper valve assembly of claim 5, wherein the alignment legs restrict rotational movement of the flapper member relative to the float assembly.

7. The flapper valve assembly of claim 1, wherein at least two of the guide legs of the flapper member define respective hook portions that extend along opposite sides of the guide support of the float assembly.

8. The flapper valve assembly of claim 1, further including a rocking mechanism provided between the float body and the flapper member which is configured to allow the flapper member to freely pivot in any direction on the float assembly.

9. The flapper valve assembly of claim 8, wherein the rocking mechanism includes a protrusion that extends from the end portion of the float body and is loosely received in a recess formed in an underside of the flapper member, and wherein the protrusion and the recess are complimentary in configuration to each other.

10. The flapper valve assembly of claim 9, wherein the float assembly further includes a guide ring that forms a cage with the vertical supports and the guide support, and wherein the protrusion is coaxially aligned with the guide ring.

11. The flapper valve assembly of claim 1, wherein a seal is supported on the flapper member and the seal is made from an elastomer composition that includes polytetrafluoroethylene (PTFE).

12. The flapper valve assembly of claim 11, wherein the polytetrafluoroethylene (PTFE) additive constitutes approximately 5% of the elastomer composition.

13. The flapper valve assembly of claim 1, wherein a seal is supported on the flapper member and the seal includes resilient protrusions that are received within holes formed in a perimeter of the flapper member for securing the seal to the flapper member.

14. A flapper valve assembly comprising:
a float body including a plurality of vertical supports and a guide ring that form a cage which extends from an end of the float body, with one of the vertical supports including a guide support;
a flapper member freely pivotable within the cage of the float body, the flapper member including a plurality of guide legs that are coupled to the guide support of the float assembly to maintain proper alignment of the flapper member relative to the float body; and
a rocking mechanism including a protrusion provided on the end of the float body and the protrusion is coaxially aligned with the guide ring, and wherein the rocking mechanism includes a recess formed in an underside of the flapper member which loosely receives the protrusion to pivotally support the flapper member on the float body, and wherein the protrusion and the recess are configured complementary in configuration to each other;
wherein the guide support includes a first side facing the protrusion and a second side opposing the first side such that the second side faces away from the protrusion;
wherein at least one of the guide legs of the flapper member defines a hook shaped portion that extends transverse to the at least one of the guide legs such that the hook shaped portion at least partially surrounds the second side of the guide support to couple the flapper member to the guide support.

15. The flapper valve assembly of claim 14, wherein the guide support of the float body further includes a ledge located on an intermediate portion to contact the guide legs of the flapper member and restrict a range of motion of the flapper member.

16. The flapper valve assembly of claim 14, wherein each of the guide legs of the flapper member defines the hook shaped portion, and the hook shaped portion of each of the guide legs at least partially surround the second side of the guide support.

17. The flapper valve assembly of claim 16, wherein the flapper member further includes at least one alignment leg that abuts against at least one of the vertical supports of the float body to restrict rotational movement of the flapper member relative to the float body.

18. The flapper valve assembly of claim 14, wherein the guide support includes opposing sides disposed adjacent to the first and second sides of the guide support, with the opposing sides of the guide support disposed between the guide legs, and wherein at least two of the guide legs of the flapper member each define respective hook shaped portions that extend toward each other to at least partially surround the second side of the guide support of the float body.

19. The flapper valve assembly of claim 14, wherein a seal is supported on the flapper member and the seal is made from an elastomer composition that includes polytetrafluoroethylene (PTFE).

20. The flapper valve assembly of claim 19, wherein the polytetrafluoroethylene (PTFE) additive constitutes approximately 5% of the elastomer composition.

21. The flapper valve assembly of claim 14, wherein a seal is supported on the flapper member and the seal includes resilient protrusions that are received within holes formed in the flapper member for securing the seal to the flapper member.

\* \* \* \* \*